(12) United States Patent
Bradfield

(10) Patent No.: US 7,973,444 B2
(45) Date of Patent: Jul. 5, 2011

(54) ELECTRIC MACHINE AND ROTOR FOR THE SAME

(75) Inventor: Michael D. Bradfield, Anderson, IN (US)

(73) Assignee: Remy Technologies, Inc., Pendleton, IN (US)

( * ) Notice: Subject to any disclaimer, the term of this patent is extended or adjusted under 35 U.S.C. 154(b) by 233 days.

(21) Appl. No.: 11/741,423

(22) Filed: Apr. 27, 2007

(65) Prior Publication Data

US 2008/0265707 A1 Oct. 30, 2008

(51) Int. Cl.
*H02K 21/12* (2006.01)

(52) U.S. Cl. ......... 310/156.71; 310/156.72; 310/156.73; 310/263; 310/156.66; 310/156.69; 310/156.08; 310/156.09; 310/156.11

(58) Field of Classification Search .............. 310/156.71, 310/156.53, 156.59, 156.66–156.72
See application file for complete search history.

(56) References Cited

U.S. PATENT DOCUMENTS

| | | | |
|---|---|---|---|
| 5,747,913 A * | 5/1998 | Amlee et al. ................. | 310/263 |
| 5,780,953 A * | 7/1998 | Umeda et al. ................ | 310/263 |
| 6,268,678 B1 | 7/2001 | Asao et al. | |
| 6,469,408 B2 | 10/2002 | Asao | |
| 6,492,754 B1 * | 12/2002 | Weiglhofer et al. ..... | 310/156.08 |
| 6,933,645 B1 * | 8/2005 | Watson ..................... | 310/156.09 |
| 7,064,466 B2 * | 6/2006 | Kusase ..................... | 310/156.66 |
| 2002/0005673 A1* | 1/2002 | Umeda et al. ............ | 310/156.11 |
| 2003/0085629 A1* | 5/2003 | Van Dine et al. ........ | 310/156.08 |
| 2003/0102758 A1* | 6/2003 | Kusase et al. ............ | 310/156.66 |
| 2004/0232799 A1* | 11/2004 | Chen et al. ................ | 310/263 |
| 2005/0006978 A1* | 1/2005 | Bradfield .................. | 310/263 |
| 2007/0290564 A1* | 12/2007 | Clark ....................... | 310/156.29 |
| 2010/0066189 A1* | 3/2010 | Horng et al. ............. | 310/156.09 |

* cited by examiner

*Primary Examiner* — Quyen Leung
*Assistant Examiner* — Terrance Kenerly
(74) *Attorney, Agent, or Firm* — Cantor Colburn LLP

(57) ABSTRACT

Disclosed herein is an electric machine rotor. The rotor includes, a rotatable shaft, a plurality of pole segments attached to the shaft, and a plurality of magnets attached to the plurality of pole segments such that one of the plurality of magnets is positioned circumferentially between adjacent pole segments and each of the plurality of magnets has non-parallel circumferentially opposing sides.

22 Claims, 5 Drawing Sheets

ELECTRIC MACHINE AND ROTOR FOR THE SAME

BACKGROUND OF THE INVENTION

Designers of electric machines such as vehicle alternators, for example, are continuously striving to increase the power density of such machines. As space in the engine compartment continues to decrease and the number of electrically powered devices used onboard vehicles increases the need for generating more electrical power in less space grows.

Increasing the power density, however, causes increases in leakage of magnetic flux. This increased leakage is due to the small sizes of the flux handling components, the small spaces therebetween and the greater flux levels being handled. Such flux leakage may limit the power density of the machine. Accordingly, the art is receptive of electrical machines with high levels of power density.

BRIEF DESCRIPTION OF THE INVENTION

Disclosed herein is an electric machine rotor. The rotor includes, a rotatable shaft, a plurality of pole segments attached to the shaft, and a plurality of magnets attached to the plurality of pole segments such that one of the plurality of magnets is positioned circumferentially between adjacent pole segments and each of the plurality of magnets has nonparallel circumferentially opposing sides.

Further disclosed herein is an electric machine rotor. The rotor includes, a rotatable shaft, a plurality of pole segments attached to the shaft and a plurality of magnets attached to the plurality of pole segments such that one of the plurality of magnets is positioned circumferentially between adjacent pole segments and each pole segment has substantially parallel circumferentially opposing sides.

Further disclosed herein is a brushless electric machine. The machine includes, a rotor assembly and at least one stationary field coil concentric within the rotor assembly. The rotor assembly has a rotatable shaft, a pole assembly fixedly attached thereto and a plurality of permanent magnets attached to the pole assembly. The pole assembly has, a first pole piece with a plurality of first pole segments attached thereto, each of the plurality of first pole segments has substantially parallel circumferentially opposing sides, and a second pole piece with a plurality of second pole segments attached thereto, each of the plurality of second pole segments has substantially parallel circumferentially opposing sides. The plurality of permanent magnets are disposed circumferentially between the plurality of first pole segments and the plurality of second pole segments.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of an embodiment of the disclosed apparatus is presented herein by way of exemplification and not limitation with reference to the Figures.

Figure 1:
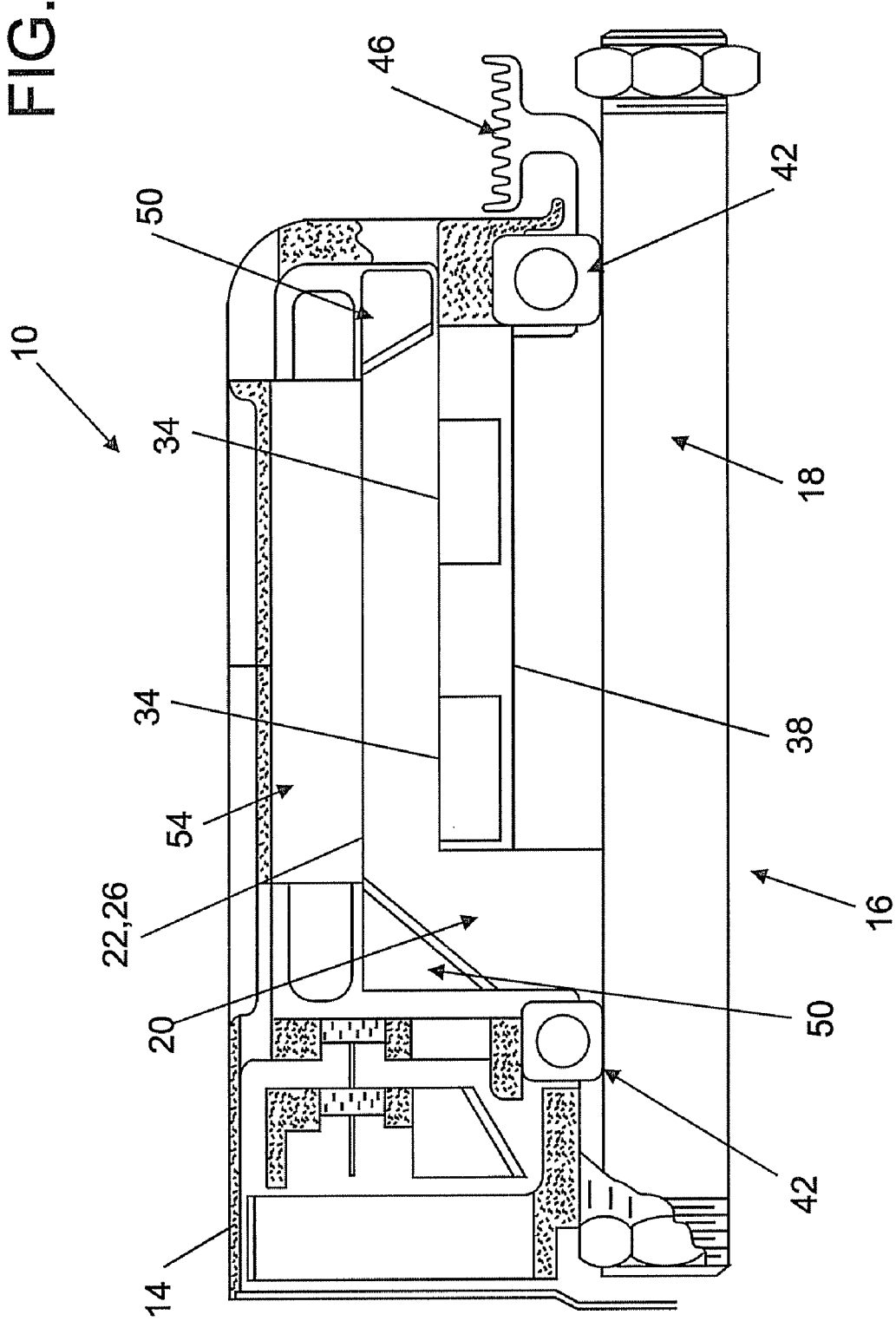
FIG. 1 depicts a partial cross section of a brushless electric machine disclosed herein.

Referring to FIG. 1, the brushless electric machine 10 disclosed herein is illustrated. The machine 10 includes a housing 14, a rotor 16 having a rotatable shaft 18 and a pole assembly 20 (having pole pieces 22, 26) attached thereto, a plurality of permanent magnets 30 (not visible in FIG. 1), and a pair of stationary field coils 34. The brushless electric machine 10 in this embodiment is an alternator. As is common in the art the brushless alternator 10 has the field coils 34 wound on a stationary metal core 38 that is fixedly attached to the housing 14 at an end thereof. Electrical current is provided to the field coils 34 by a control circuit that is described with reference to FIG. 6 below. The rotor 16 is rotationally mounted to the housing 14 by bearings 42 near opposite axial ends of the shaft 18. A pulley 46 is fixedly attached to the shaft 18 to provide rotational energy to the rotor 16 from a belt (not shown) driven by an engine (also not shown). One or more fans 50 may be attached to the rotor 16, more specifically to the pole pieces 22, 26 to promote air flow through the machine 10 to facilitate cooling. A stator 54 is in axial alignment with the rotor 16 and is described in reference to FIG. 7 below.

Figure 2:
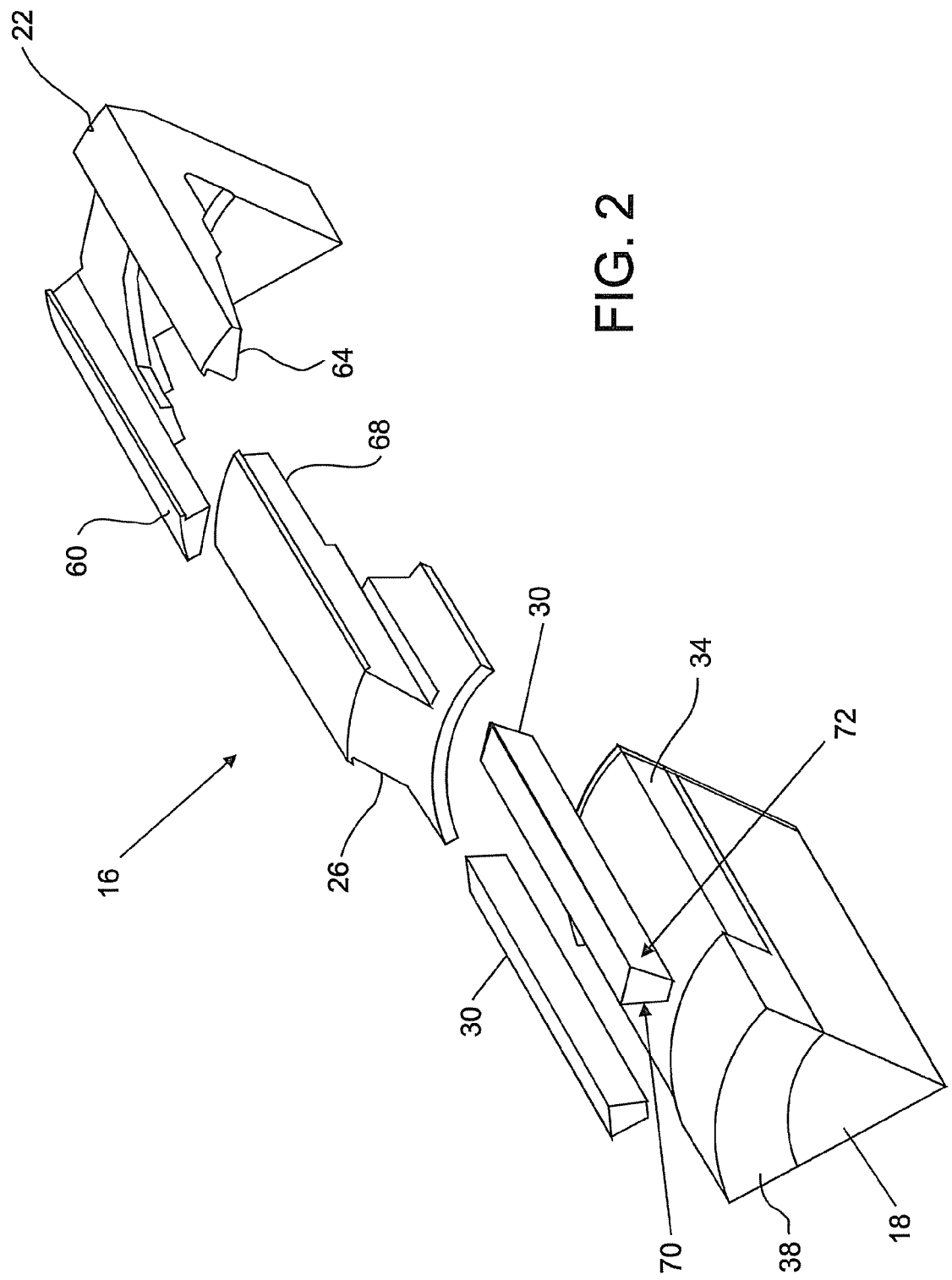
FIG. 2 depicts a partial exploded view of a rotor disclosed herein.
Figure 3:
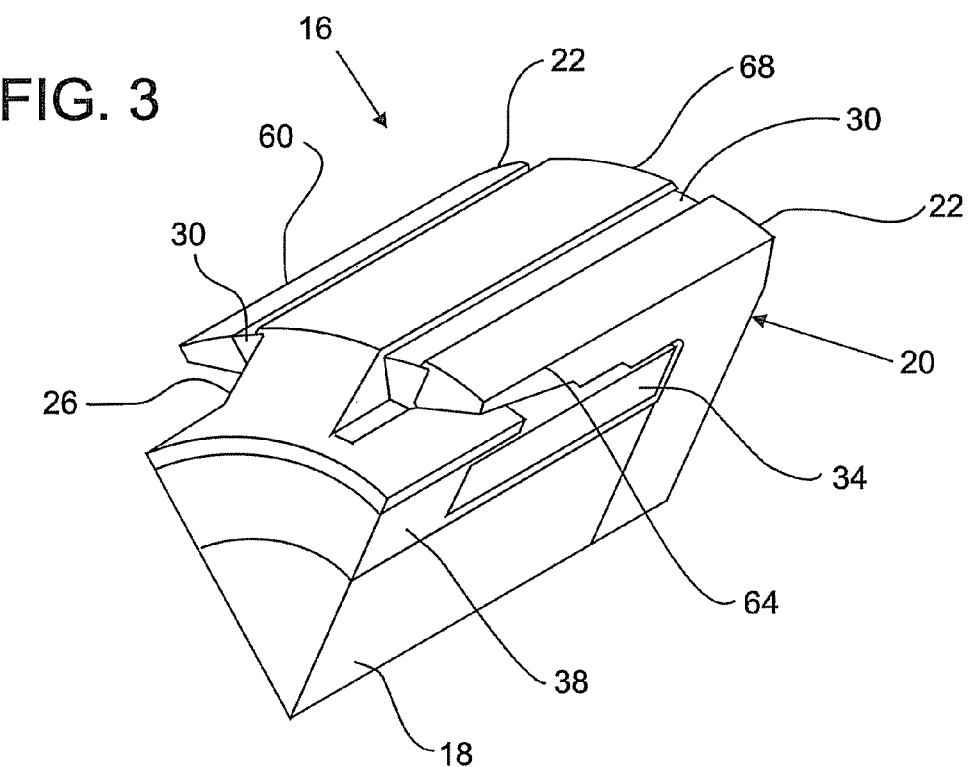
FIG. 3 depicts a partial perspective view of the rotor of FIG. 2.

Referring to FIGS. 2 and 3, construction of the rotor 16 is shown in detail. The shaft 18 of the rotor 16, in this embodiment, is fixedly attached to the pole pieces 22, 26 through the pole piece 22. Each of the pole pieces 22, 26 have a plurality of pole segments 60, 64, 68, three of which are shown herein. The pole segments 60 and 64 are attached to the pole piece 22, while the pole segment 68 is attached to the pole piece 26. The two pole pieces 22, 26 have polarities opposite to one another and as such the pole segments 60 and 64 have a polarity that is opposite to that of the pole segment 68. The permanent magnets 30 are fixedly attached to the pole pieces 22, 26 between the pole segments 60, 64 and 68. The permanent magnets 30 are magnetized circumferentially such that a North pole is on an end near a first radial surface 70 and a South pole is on an end near a second radial surface 72, and the surface 70 is circumferentially opposite of the surface 72 on the magnet 30. The magnetism of the permanent magnets 30 generates magnetic poles in the pole pieces 22, 26.

Figure 4:
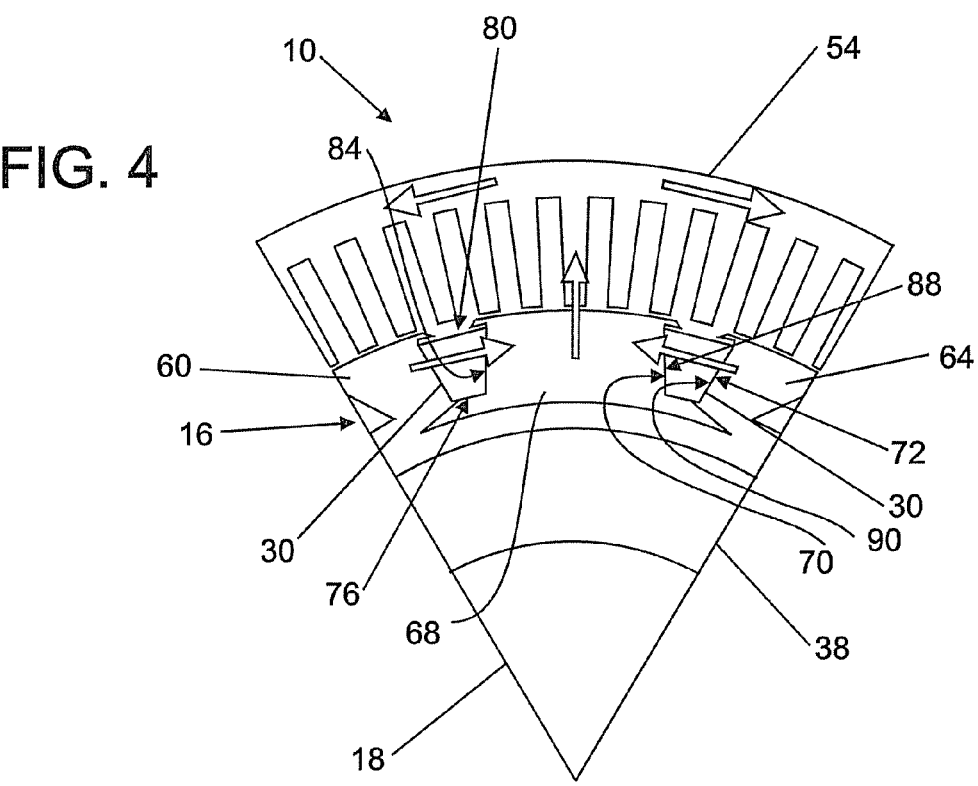
FIG. 4 depicts a partial cross sectional view of the rotor of FIG. 2.

Referring to FIG. 4, the surfaces 70, 72 of the magnets 30, as illustrated, are not parallel to one another. The magnets 30 have a generally trapezoidal shape, however, a radially inner surface 76 and a radially outer surface 80 of the magnets 30 may be but are not necessarily flat surfaces. For example, the surfaces 76 and 80 could be arcuate. Additionally, the magnets 30 and the pole segments 60, 64 are sized such that circumferentially opposing surfaces 84, 88 on the pole segment 68 are substantially parallel to one another. Similarly, circumferentially opposing sides of each of the other pole segments are substantially parallel as well. The magnets 30 are positioned relative to the pole pieces 22, 26 such that the surface 70 of the magnet 30 abuts and is therefore substantially parallel to a surface 88 of the pole segment 68 similarly the surface 72 abuts and is therefore substantially parallel to a surface 90 of the pole segment 64. The foregoing structure of having circumferentially opposing surfaces substantially parallel to one another can reduce flux leakage between adjacent pole segments when compared to pole segments that have nonparallel circumferentially opposing surfaces as is commonly done in the art.

Figure 5:
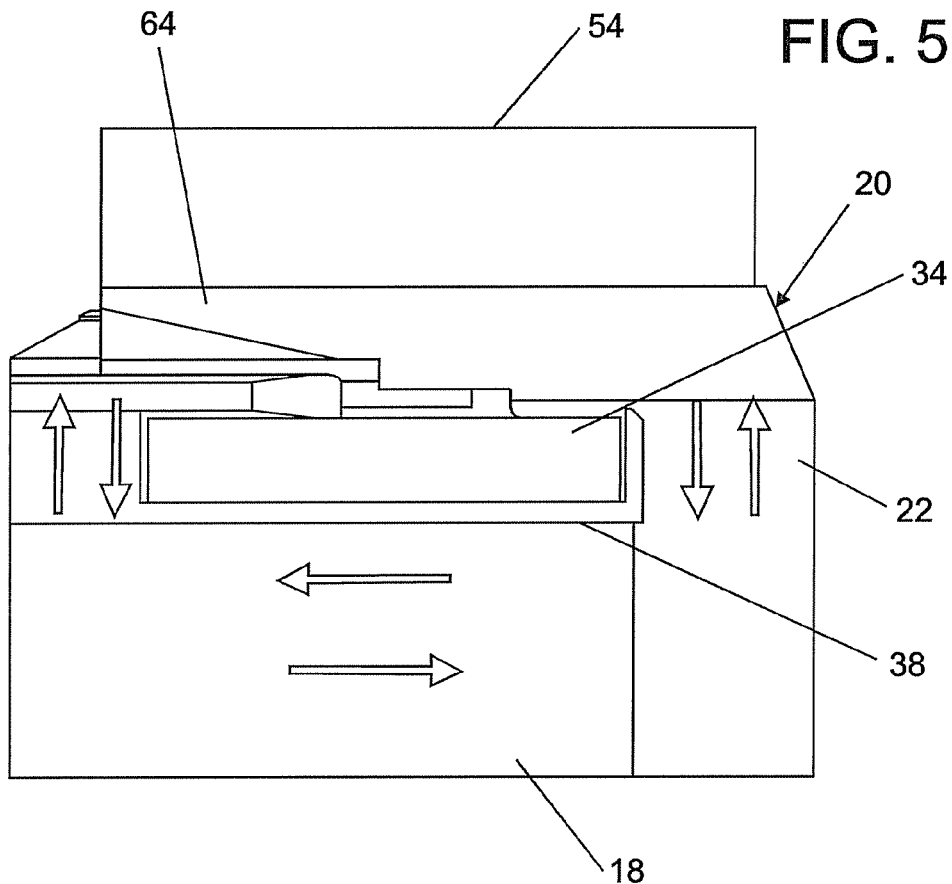
FIG. 5 depicts a partial cross sectional view of a field coil and rotor disclosed herein.

Referring to FIG. 5, a single field coil 34 is shown wrapped about the core 38. Current flow through the field coil 34 creates a magnetic field, the flux of which can either add to (boost) or subtract from (buck) the flux generated by the permanent magnets 30 depending upon the direction of current travel through the field coil 34. As such the power density of the machine 10 and the resulting electrical power generated can be increased or decreased through control of the current through the field coil 34. Controlling the direction of current flow through the field coil 34 can be done with a H-bridge control circuit, for example, as described below.

Figure 6:
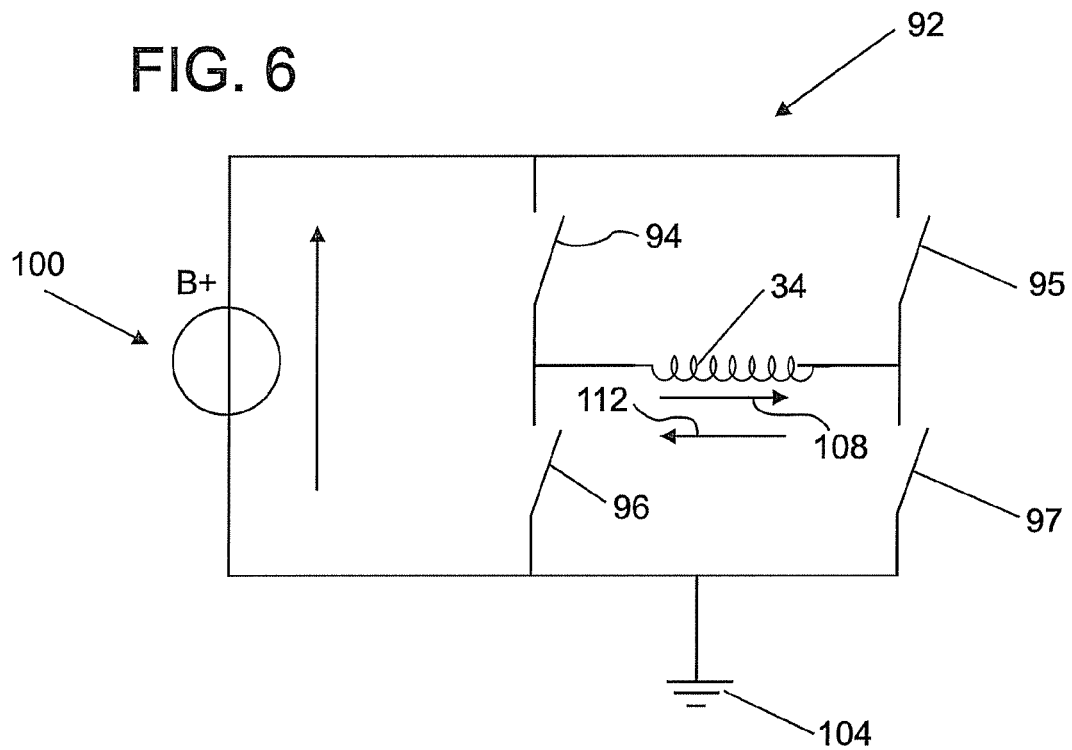
FIG. 6 depicts a H-bridge circuit disclosed herein.

Referring to FIG. 6, a H-bridge control circuit 92 is illustrated. The circuit 92 includes four switches 94, 95, 96 and 97, which together determine the path for current flow from a B+ power source 100, through the field coil 34 to ground 104. If, for example, the switches 94 and 97 are closed and the switches 95 and 96 are open, current will flow through the coil 34 in the direction of arrow 108. Conversely, if the switches 95 and 96 are closed and the switches 94 and 97 are open, current will flow through the coil 34 in the opposite direction that is in the direction of arrow 112. By incorporating the circuit 92 into a control system one skilled in the art could control the status of the switches 94, 95, 96 and 97 in pairs to facilitate boosting the magnetic flux when desired and conversely bucking the magnetic flux when desired to thereby control the output of the electric machine 10. High electrical output of such a machine can generate undesirable magnetic noise; design enhancements, however, can be made to the stator 54 to minimize this undesirable magnetic noise.

Figure 7:
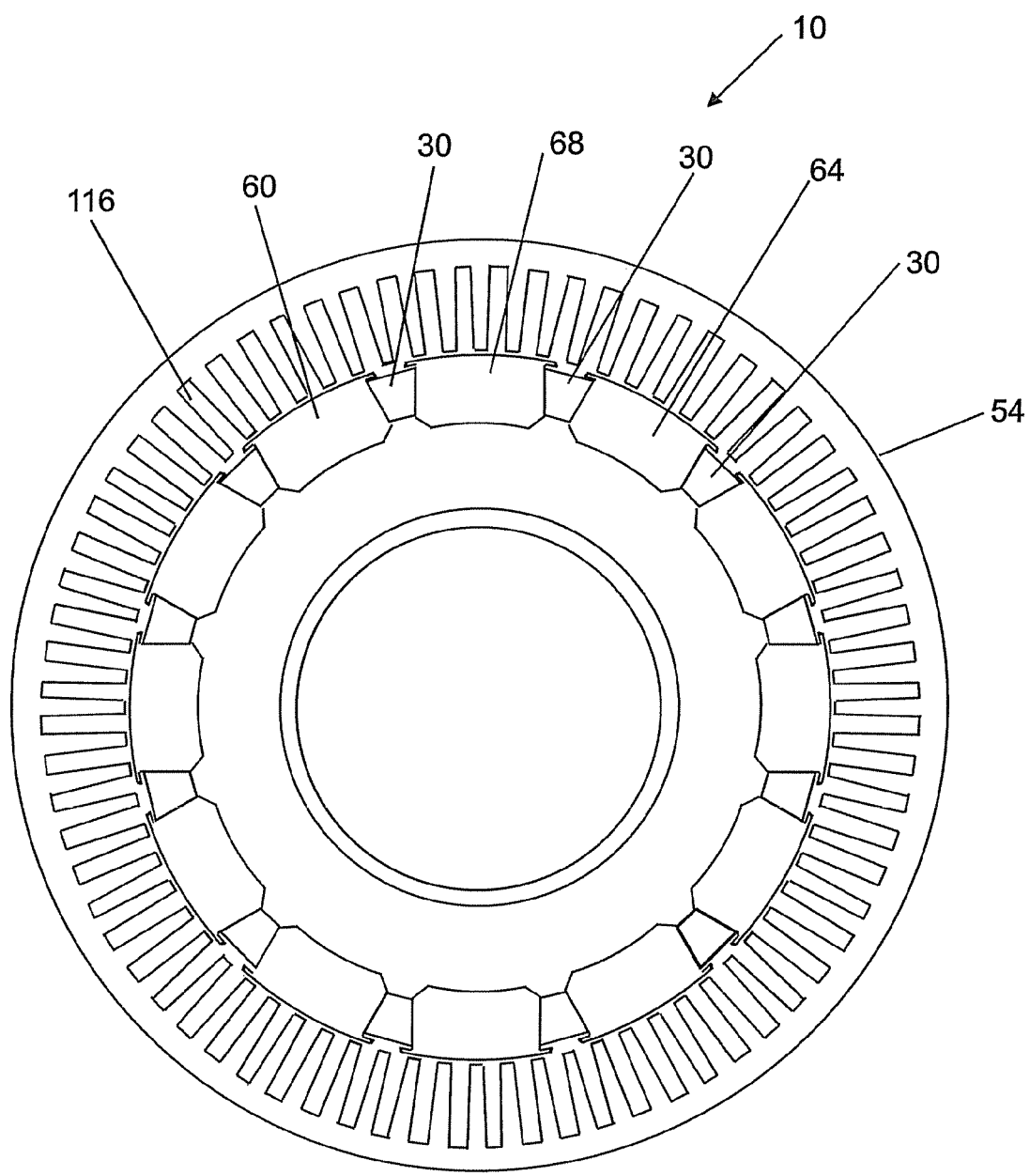
FIG. 7 depicts a cross sectional view an electric machine disclosed herein.

Referring to FIG. 7, the stator 54 is shown surrounding the rotor 16. The stator 54 has twice the number of slots 116 as is typically used with a single 3-phase wound stator. The extra slots 116 accommodate a second 3-phase winding (not shown). Such stators 54, with two sets of 3-phase windings, are known in the industry. An example of a stator with two sets of 3-phase windings is described in detail in U.S. Pat. No. 6,469,408, which is incorporated herein in its entirety by reference. Having two sets of 3-phase windings in the stator 54 can help minimize magnetic noise of the machine 10.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine rotor, comprising:
a rotatable shaft;
a plurality of pole segments attached to the shaft, each pole segment of the plurality of pole segments comprising substantially parallel circumferentially opposing surfaces extending substantially axially along the shaft; and
a plurality of magnets attached to the plurality of pole segments such that one of the plurality of magnets is positioned circumferentially between adjacent pole segments, each of the plurality of magnets having nonparallel circumferentially opposing sides.

2. The electric machine rotor of claim 1, wherein the plurality of magnets are permanent magnets.

3. The electric machine rotor of claim 1, wherein the plurality of magnets are magnetized circumferentially such that opposing magnetic poles are disposed at opposing circumferential surfaces of the plurality of magnets.

4. The electric machine rotor of claim 1, wherein a magnetic field strength of the plurality of pole segments is modifiable by at least one stationary field coil.

5. The electric machine rotor of claim 4, wherein a magnetic field strength of the plurality of pole segments is increasable by the at least one stationary field coil.

6. The electric machine rotor of claim 4, wherein a magnetic field strength of the plurality of pole segments is decreasable by the at least one stationary field coil.

7. The electric machine rotor of claim 4, wherein the stationary field coil is positionable concentrically within the plurality of pole segments.

8. The electric machine rotor of claim 1, wherein the electric machine rotor is operable in an alternator.

9. The electric machine rotor of claim 1, wherein the electric machine rotor is operable in a brushless machine.

10. An electric machine rotor, comprising:
a rotatable shaft;
a plurality of pole segments attached to the shaft; and
a plurality of magnets attached to the plurality of pole segments such that one of the plurality of magnets is positioned circumferentially between adjacent pole segments, each pole segment of the plurality of pole segments having substantially parallel circumferentially opposing surfaces extending substantially axially along the shaft.

11. The electric machine rotor of claim 10, wherein the substantially parallel circumferentially opposing surfaces abut circumferentially opposing sides of the plurality of magnets.

12. The electric machine rotor of claim 10, wherein the electric machine rotor is operable in an alternator.

13. A brushless electric machine, comprising:
a rotor assembly comprising:
a rotatable shaft;
a pole assembly fixedly attached thereto, the pole assembly comprising:
a first pole piece with a plurality of first pole segments attached thereto, each of the plurality of first pole segments having substantially parallel circumferentially opposing surfaces extending substantially axially along the shaft; and
a second pole piece with a plurality of second pole segments attached thereto, each of the plurality of second pole segments having substantially parallel circumferentially opposing surfaces extending substantially axially along the shaft; and
a plurality of permanent magnets disposed circumferentially between the plurality of first pole segments and the plurality of second pole segments; and
at least one stationary field coil concentric within the rotor assembly.

14. The brushless electric machine of claim 13, wherein the brushless electric machine is an alternator.

15. The brushless electric machine of claim 13, further comprising a H-bridge control circuit wherein a direction of current flow through the at least one stationary field coil is controllable by the H-bridge control circuit.

16. The brushless electric machine of claim 13, wherein the performance of the brushless electric machine is modifiable via current control through the at least one stationary field coil.

17. The brushless electric machine of claim 16, wherein the performance comprises power generation.

18. The brushless electric machine of claim 16, wherein the performance comprises power density.

19. The brushless electric machine of claim 13, wherein each of the plurality of permanent magnets have nonparallel circumferentially opposing sides.

20. The brushless electric machine of claim 13, wherein the nonparallel circumferentially opposing sides of the plurality of magnets abuts the substantially parallel circumferentially opposing surfaces of the plurality of pole segments.

21. The brushless electric machine of claim 13, further comprising a stator in operable communication with the rotor assembly the stator having two three-phase windings that are electrically offset from one another.

22. The brushless electric machine of claim 21, wherein the electrical offset is 30 degrees.

* * * * *